United States Patent Office 3,436,392
Patented Apr. 1, 1969

3,436,392
10-AMINOPROPIONYLPHENOTHIAZINES
Alfred R. Maass, Swarthmore, Joseph Weinstock, Phoenixville, and Virgil D. Wiebelhaus, Springfield, Pa., assignors to Smith Kline & French Laboratories, Philadelphia, Pa., a corporation of Pennsylvania
No Drawing. Continuation-in-part of application Ser. No. 423,581, Jan. 5, 1965. This application Mar. 23, 1966, Ser. No. 536,643
Int. Cl. C07d *93/14;* C07c *101/00*
U.S. Cl. 260—243                                    13 Claims

ABSTRACT OF THE DISCLOSURE 10-aminopropionylphenothiazines having at least a 2-halogen substituent wherein the amino moiety may be primary, secondary or tertiary, including carboalkoxy and carbobenzoxy amino, and certain 5-oxidized products thereof have anti-inflammatory activity. The compounds are generally prepared by acylation of a 10-unsubstituted phenothiazine followed by appropriate oxidation.

---

This application is a continuation-in-part of Ser. No. 423,581 filed on Jan. 5, 1965.

This invention relates to 10-aminopropionylphenothiazines which have useful anti-inflammatory activity. Some of the phenothiazine compounds described herein also have utility as chemical intermediates.

The novel compounds of this invention are represented by the following general structural formulas:

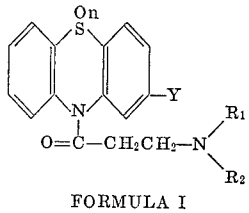     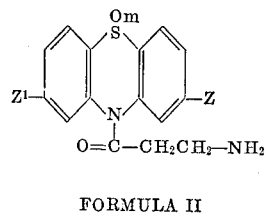

FORMULA I               FORMULA II wherein:

$m$ represents a positive whole integer from 0 to 2, inclusive;

$n$ represents a positive whole integer from 1 to 2, preferably 1;

Y represents halogen, for example chlorine, bromine or fluorine;

Z and $Z^1$ represent hydrogen or halogen, for example chlorine, bromine or fluorine;

$R_1$ represents hydrogen or methyl, preferably methyl; and $R_2$ represents methyl.

A preferred compound of this invention is 10-dimethylaminopropionyl-2-chlorophenothiazine-5-oxide.

This invention also includes salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The 10-aminopropionyl-phenothiazines of Formulas I and II above are characterized by having unique and selective anti-inflammatory activity demonstrated by a number of different pharmacological test procedures together with a low degree of toxicity. Although structurally unrelated to the steroids, the compounds of this invention possess some glucocorticoid-like activity.

A particularly significant aspect of this invention is the strict structural requirements necessary for anti-inflammatory activity. On the basis of pharmacological evaluation of a large number of 10-aminoacylphenothiazines it can be concluded that:

(a) Compounds with a branched acyl side chain are inactive;

(b) Lengthening the acyl side chain to butyryl or shortening to acetyl markedly reduces activity;

(c) In Formula I when the nucleus of the phenothiazine is unsubstituted activity is reduced;

(d) When a halogen substituent is placed at positions other than the 2- or 2,7-positions on the phenothiazine activity is reduced;

(e) When a substituent other than halogen is placed at the 2-position activity is reduced;

(f) Compounds with a heterocyclic amino group on the acyl side chain, such as piperidinyl or N-methylpiperazinyl, are inactive; and (g) In Formula I oxidized phenothiazines are the most consistently active compounds.

The novel compounds of this invention represented by Formula I above are prepared by starting with 10-unsubstituted phenothiazines. When Y and Z are as defined above, $R_1$ is hydrogen or methyl, $R_2$ is methyl and X is halogen, such as chlorine or bromine, the 10-substituted compounds are prepared as illustrated by the following reaction schemes:

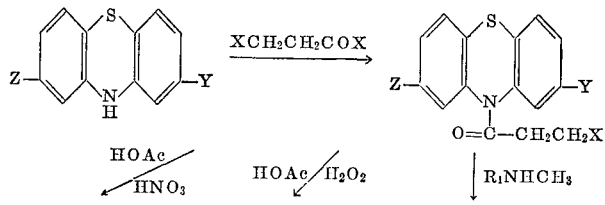

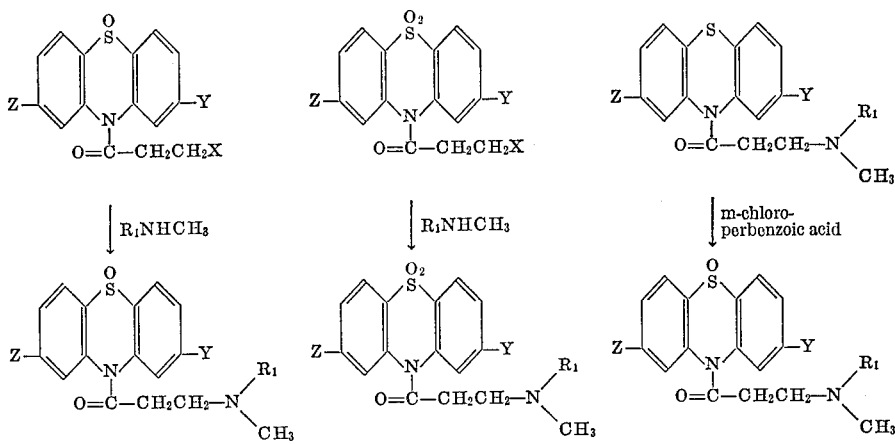

Thus as shown above, the 10-unsubstituted phenothiazine is acylated with a β-halopropionyl halide, for example β-chloropropionyl chloride or β-bromopropionyl bromide, to give the corresponding 10-(β-halopropionyl)-phenothiazine. To prepare the phenothiazine-5-oxides, the 10-(β-halopropionyl)-phenothiazine is either oxidized with an acetic acid-nitric acid mixture to give the corresponding 5-oxide, followed by reaction with methylamine or dimethylamine to give the products or is first reacted with the appropriate amine and the resulting 10-aminoacylphenothiazine is oxidized to give the products. The latter procedure involves a novel oxidation of an amino substituted phenothiazine to give the 5-oxide without the side formation of an N-oxide. In this novel oxidation the 10-aminoacylphenothiazine, in the form of an acid addition salt, for example a hydrohalide, preferably hydrochloride, in a suitable nonreactive organic solvent such as chloroform is reacted with an approximately equimolar quantity of m-chloroperbenzoic acid at a temperature below 10° C. with gradual warming to ambient or room temperature for a total reaction time of from one-half to eight hours. Addition of a precipitating solvent such as ether gives the 10-aminoacylphenothiazine acid addition salt.

To prepare the phenothiazine 5-dioxides, the 10-(β-halopropionyl)-phenothiazine is oxidized in glacial acetic acid solution with a 30% aqueous solution of hydrogen peroxide to give the corresponding 5-dioxide followed by reaction with methylamine or dimethylamine to give the products.

The primary amino compounds of Formula II above are prepared as illustrated by the following reaction schemes where Z and $Z^1$ are as defined above, X is halogen such as chlorine or bromine, and $R_3$ is benzyl or lower alkyl such as methyl or ethyl:

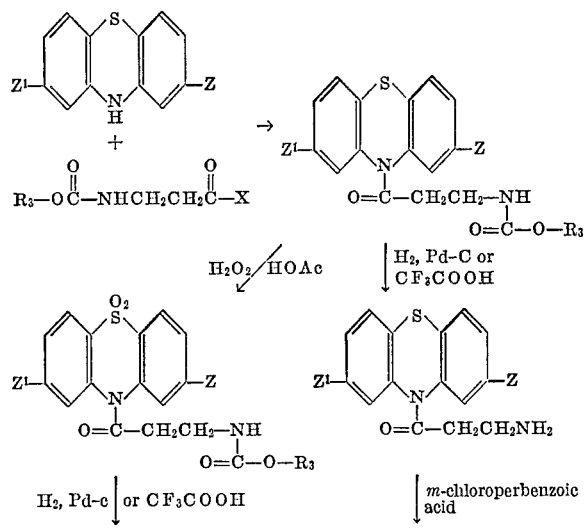

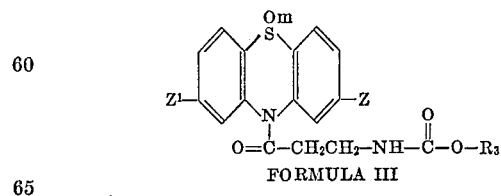

Thus as shown above, the phenothiazine is acylated with an N-carbobenzoxy- or carbalkoxy - β - aminopropionyl halide, preferably chloride (prepared from the corresponding propionic acid by reaction with phosphorus pentachloride), in an unreactive organic hydrocarbon solvent such as benzene or toluene at reflux temperature for from 8–24 hours to give the 10-substituted phenothiazine. The above acylation followed by removal of the N-protective group either by hydrogenolysis in a lower alkanolic solvent, preferably ethanol, and in the presence of a palladium catalyst, preferably palladium on charcoal, or by hydrolysis with trifluoroacetic acid provides a novel method for the preparation of a 10-aminoacylphenothiazine.

Oxidation to the 10-(β-aminopropionyl)-phenothiazine-5-oxide and 5-dioxide is accomplished by methods as described above. To prepare the 5-oxide, the 10-aminopropionyl-phenothiazine acid addition salt is reacted with m-chloroperbenzoic acid. To prepare the 5-dioxide, the 10-(N-carbobenzoxy- or -carboalkoxy-β-aminopropionyl)-phenothiazine is first oxidized with hydrogen peroxide followed by removal of the N-protective group as described above.

The N-protected 10-aminopropionyl phenothiazines described in the above reaction schemes, in addition to being useful intermediates for the preparation of the primary aminopropionyl phenothiazines of Formula II, also have useful anti-inflammatory activity and may be set forth generically as follows:

![Formula III structure: phenothiazine with $O_m$ on S, $Z^1$ and Z substituents, N-acyl group $O=C-CH_2CH_2-NH-C(=O)-O-R_3$]

FORMULA III wherein:

$m$ represents a positive whole integer from 0 to 2, inclusive;

Z and $Z^1$ represent hydrogen or halogen, for example chlorine, bromine or fluorine; and $R_3$ represents benzyl or lower alkyl of from 1 to 4 carbon atoms such as methyl, ethyl or butyl.

The compounds of Formula III are prepared as described above. The 5-oxides are obtained by oxidation of the corresponding phenothiazine acid addition salt with m-chloroperbenzoic acid. Alternatively, a primary amino acylphenothiazine may be reacted with an appropriate $R_3OCO$-halide to give the compounds of Formula III.

The following examples illustrate the above described procedures for the preparation of compounds of this invention, including novel intermediates and novel processes, but are not to be considered as a limitation thereof.

EXAMPLE 1

A mixture of 46.6 g. of 2-chlorophenothiazine, 26.7 g. of β-chloropropionyl chloride and 250 ml. of dry benzene is refluxed for 12 hours. The reaction mixture is evaporated to dryness and the residue recrystallized from alcohol to give 10-(β-chloropropionyl)-2-chlorophenothiazine, M.P. 113–115° C.

The above prepared 10-substituted phenothiazine (10.35 g.) is dissolved in 100 ml. of dry benzene and 5.75 g. of dimethylamine in dry benzene is added. The mixture is heated in a pressure bottle on a steam bath for 15 hours, filtered and the filtrate is evaporated to dryness. The residue is taken up in ethanol, acidified with isopropanolic hydrogen chloride and ether is added to precipitate 10-(β-dimethylaminopropionyl) - 2 - chlorophenothiazine hydrochloride, M.P. 172–174° C.

To a solution of 3.85 g. of 10-(β-dimethylaminopropionyl)-2-chlorophenothiazine hydrochloride in 125 ml. of chloroform is added slowly 2.03 g. of 85% m-chloroperbenzoic acid, maintaining the temperature below 10° C. The reaction mixture is allowed to come to room temperature and ether is added to precipitate 10-(β-dimethylaminopropionyl)-2-chlorophenothiazine - 5 - oxide hydrochloride, M.P. 199–200° C.

Similarly, employing 55.6 g. of 2-bromophenothiazine in the above reaction sequence gives the product, 10-(β-dimethylaminopropionyl) - 2 - bromophenothiazine-5-oxide hydrochloride.

EXAMPLE 2

To a solution of 47.6 g. of 10-(β-chloropropionyl)-2-chlorophenothiazine (prepared as in Example 1) in 1050 ml. of glacial acetic acid is added 35 ml. of 30% hydrogen peroxide and the resultant solution is heated to 60° C. for 15 minutes. An additional 21 ml. of 30% hydrogen peroxide is added and the solution is heated for two hours at 60–70° C. The cooled reaction mixture is filtered and the filtrate diluted with water to give a total yield of the product, 10 - (β-chloropropionyl)-2-chlorophenothiazine-5-dioxide, M.P. 177–179° C.

The above prepared phenothiazine (7.12 g.) is dissolved in 100 ml. of dimethylformamide and 0.744 g. of methylamine in 11 ml. of dimethylformamide is added with cooling. The resultant solution is cooled for 12–15 hours and then evaporated to dryness. The residue is taken up in ethanol and diluted with ether to yield 10-(β-methylaminopropionyl) - 2 - chlorophenothiazine - 5 - dioxide hydrochloride, dec. 211.5° C.

EXAMPLE 3

A solution of 1.35 g. of dimethylamine in 14 ml. of dimethylformamide is added with cooling to a solution of 9.0 g. of 10 - (β-chloropropionyl)-2-chlorophenothiazine-5-dioxide (prepared as in Example 2). After cooling for two days, the reaction mixture is evaporated to dryness in vacuo and the residue is taken up in 200 ml. of ethanol. Dilution with ether yields 10-(β-dimethylaminopropionyl)-2-chlorophenothiazine - 5 - dioxide hydrochloride, M.P. 206.5–208° C.

EXAMPLE 4

A solution of 58.0 g. of 10-(β-chloropropionyl)-2-chlorophenothiazine (prepared as in Example 1) in 1140 ml. of acetic acid is cooled in an ice-bath and 76 ml. of concentrated nitric acid is added dropwise with stirring. After 20 minutes, an additional 19 ml. of nitric acid is added and the mixture is allowed to stand in the ice-bath for 30 minutes. The reaction mixture is then poured over ice to give the solid 10-(β-chloropropionyl)-2-chlorophenothiazine-5-oxide, M.P. 114–116° C.

To a solution of 13.6 g. of the above prepared 5-oxide in 100 ml. of dimethylformamide is added 1.86 g. of methylamine in 25 ml. of dimethylformamide with cooling. After cooling for 12–15 hours, the reaction mixture is filtered and the filtrate evaporated to dryness to give 10-(β-methylaminopropionyl) - 2 - chlorophenothiazine-5-oxide hydrochloride, M.P. 205.5–206.5° C.

Similarly, reaction of the above 10-(β-chloropropionyl)-2-chlorophenothiazine-5-oxide with dimethylamine in dimethylformamide yields 10-(β-dimethylaminopropionyl)-2-chlorophenothiazine-5-oxide hydrochloride, identical with the product of Example 1 above.

EXAMPLE 5

Finely pulverized phosphorus pentachloride (18.6 g.) is suspended in 150 ml. of dry ether, cooled to 0° C. and 20.0 g. of dry, pulverized N-carbobenzoxy-β-aminopropionic acid is added. The mixture is stirred in the cold for one hour, filtered and the filtrate distilled, first at a temperature below 10° C. and then gradually to 45° C., using portions of dry toluene to remove the hydrogen chloride and phosphorus oxychloride present. The residue obtained is N-carbobenzoxy-β-aminopropionyl chloride. Similarly, there is prepared N-carbomethoxy- or N-carboethoxy-β-aminopropionyl chloride which is likewise used as follows to give corresponding products.

A mixture of 72.5 g. of the above prepared chloride, 68 g. of 2-chlorophenothiazine and 600 ml. of dry benzene is refluxed for 12–15 hours. The reaction mixture is evaporated to dryness, the residue is dissolved in a small amount of benzene and the solution poured onto a column containing about 1500 g. of Florisil. The column is first eluted with 70% benzene:30% hexane and then with 80% ether:20% benzene. The latter eluate is evaporated and the residue triturated to yield 10-(N-carbobenzoxy-β-aminopropionyl) - 2 - chlorophenothiazine, M.P. 106–107° C. The latter compound may be oxidized with m-chloroperbenzoic acid as described in Example 1 to give the corresponding 5-oxide.

To a solution of 8.11 g. of the above prepared unoxidized phenothiazine in 100 ml. of ethanol is added 2 ml. of concentrated hydrochloric acid and then 2 g. of 10% palladium on charcoal. The mixture is hydrogenated with shaking on a Parr apparatus for two and one-half hours. The catalyst is then removed by filtration and the filtrate diluted with ether to give 10-(β-aminopropionyl)-2-chlorophenothiazine hydrochloride, M.P. 261° C.

Similarly, employing 67.5 g. of 2-fluorophenothiazine in the above reaction sequence gives the product, 10-(β-aminopropionyl)-2-fluorophenothiazine hydrochloride.

EXAMPLE 6

To a solution of 3.41 g. of 10-(β-aminopropionyl)-2-chlorophenothiazine hydrochloride (prepared as in Example 5) in 100 ml. of chloroform is added slowly 2.03 g. of 85% m-chloroperbenzoic acid at a temperature below 10° C. The reaction mixture is allowed to come to room temperature and ether is added to precipitate 10-(β-aminopropionyl) - 2 - chlorophenothiazine-5-oxide hydrochloride.

EXAMPLE 7

To a solution of 64.5 g. of 10-(N-carbobenzoxy-β-aminopropionyl)-2-chlorophenothiazine (prepared as in Example 5) in 100 ml. of glacial acetic acid is added 35 ml. of 30% hydrogen peroxide and the resultant solution is heated to 60° C. for 15 minutes. An additional 21 ml. of 30% hydrogen peroxide is added and the solution is heated for two hours at 60–70° C. The cooled reaction mixture is filtered and the filtrate diluted with water to give the product, 10-(N-carbobenzoxy-β-aminopropionyl)-2-chlorophenothiazine-5-dioxide, M.P. 133–136° C. after recrystallization from ethanol.

A mixture of 9.4 g. of the above prepared phenothiazine in 125 ml. of ethanol, 2 ml. of concentrated hydrochloric acid and 2 g. of 10% palladium on charcoal is hydrogenated with shaking on a Parr apparatus for three hours. The catalyst is removed by filtration and the filtrate diluted with ether to give 10-(β-aminopropionyl)-2-chlorophenothiazine-5-dioxide hydrochloride.

Similarly, 10-(N-carbomethoxy- or N-carboethoxy-β-aminopropionyl)-2-chlorophenothiazine (prepared as in Example 5) are reacted as described above to give corresponding products.

EXAMPLE 8

To a suspension of 214 g. of phenothiazine in 1.2 l. of dry benzene is added 1.072 moles of β-carbobenzoxy-aminopropionyl chloride and the mixture is heated to reflux for 20 hours. The reaction mixture is cooled in an ice bath and the solution decanted. Charcoal is added and the suspension is refluxed for 15 minutes, filtered hot and the filtrate evaporated. The residue is dissolved in 750 ml. of boiling isopropyl alcohol, allowed to cool to room temperature and then at 0° C. The crystalline material is purified by further recrystallization to give 10-(N-carbobenzoxy - β - aminopropionyl)-phenothiazine, M.P. 113–114.5° C.

Similarly, 287 g. of 2,7-dichlorophenothiazine is reacted as described above to give 10-(N-carbobenzoxy-β-aminopropionyl)-2,7-dichlorophenothiazine which may be further reacted as described in the following examples to give corresponding products.

EXAMPLE 9

A solution of 60.75 g. of 10-(N-carbobenzoxy-β-aminopropionyl)-phenothiazine (prepared as in Example 8) in 180 ml. of trifluoroacetic acid is refluxed for 15 minutes. The reaction mixture is evaporated under reduced pressure, using a water bath at approximately 65° C. The residue is dissolved in 750 ml. of methanol and a saturated solution of hydrogen chloride in ether is added to give 10-(β-aminopropionyl)-phenothiazine hydrochloride, M.P. 249° C. (dec.).

EXAMPLE 10

To a solution of 141.75 g. of 10-(N-carbobenzoxy-β-aminopropionyl)-phenothiazine (prepared as in Example 8) in 1.9 l. of glacial acetic acid is added 95.2 ml. of a 30% hydrogen peroxide solution and the mixture is heated to 60–64° C. for 15 minutes. An additional 57.4 ml. of hydrogen peroxide solution is added and heating continued for two hours. The cooled reaction mixture is poured into water and the solid thus obtained is recrystallized from isopropyl alcohol to give 10-(N-carbobenzoxy-β-aminopropionyl)-phenothiazine - 5 - dioxide, M.P. 135–136° C.

EXAMPLE 11

A mixture of 47.0 g. of 10-(N-carbobenzoxy-β-aminopropionyl)-phenothiazine-5-dioxide (prepared as in Example 10) and 125 ml. of trifluoroacetic acid is refluxed for 15 minutes. The reaction mixture is evaporated under reduced pressure and the residue is dissolved in methanol which had been saturated with hydrogen chloride to give the product, 10-(β-aminopropionyl)-phenothiazine-5-dioxide hydrochloride, M.P. 183.5° C. (dec.).

EXAMPLE 12

The following compounds of Formula III are prepared by methods described hereinabove:

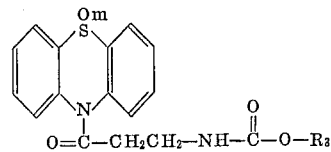

| $m$ | Z | $R^3$ | M.P., ° C. |
|---|---|---|---|
| 0 | Cl | Benzyl | 106–107 |
| 2 | Cl | do | 133–136 |
| 0 | Cl | Methyl | 125–127 |
| 2 | Cl | do | 155–157 |
| 0 | Cl | Ethyl | 119–121 |
| 2 | Cl | do | 188–190 |
| 0 | H | Benzyl | 113.5–115 |

The above compounds where $m$ is 0 are oxidized with m-chloroperbenzoic acid as described in Example 1 to give each of the corresponding phenothiazine sulfoxides ($m$ is 1).

We claim:
1. A compound of the class consisting of a free base and a nontoxic acid addition salt thereof, said free base having the formula:

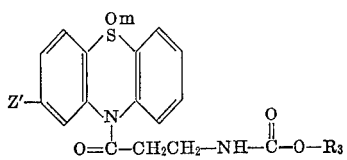

in which:
   $m$ represents a positive whole integer from 0 to 2;
   Z and Z' represent hydrogen or halogen; and
   $R_3$ represents benzyl or lower alkyl.

2. A compound in accordance with claim 1 in which Z represents chlorine and Z' represents hydrogen.

3. A compound in accordance with claim 2 in which $R_3$ represents benzyl.

4. A compound in accordance with claim 3 in which $m$ represents 0.

5. A compound in accordance with claim 3 in which $m$ represents 2.

6. A compound in accordance with claim 2 in which $R_3$ represents methyl or ethyl.

7. A compound in accordance with claim 6 in which $m$ represents 0.

8. A compound in accordance with claim 6 in which $m$ represents 1.

9. A compound in accordance with claim 6 in which $m$ represents 2.

10. In the method for the preparation of a compound having the formula:

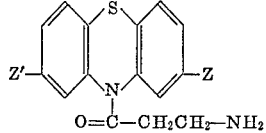

in which Z and Z' represent hydrogen or halogen, the step which consists of refluxing a compound of claim 1, in which $m$ represents 0, with trifluoroacetic acid.

11. A compound in accordance with claim 7 in which $R_3$ represents ethyl.

12. A compound in accordance with claim 9 in which $R_3$ represents methyl.

13. A compound in accordance with claim 9 in which $R_3$ represents ethyl.

References Cited

UNITED STATES PATENTS

| | | | |
|---|---|---|---|
| 3,258,459 | 1/1966 | Yale et al. | 260—243 |
| 2,863,865 | 12/1958 | Aspergren et al. | 260—243 |
| 2,591,679 | 4/1952 | Cusic | 260—243 |
| 2,694,706 | 11/1954 | Cusic | 260—243 |

FOREIGN PATENTS

| | | |
|---|---|---|
| 884,661 | 12/1961 | England. |
| 740,932 | 11/1954 | England. |

OTHER REFERENCES

Schenker-Herbst: Progress in Drug Research, vol. 5, pp. 494–97, 521 and 522, Birkhauser Verlap Basel, Switzerland (1963).

Flynn et al.: J. Am. Chem. Soc., vol. 77, pp. 3104–06 (1955).

Burger: Medicinal Chemistry, 2nd ed. (1960), Interscience Publ., Inc. (N.Y.), p. 714.

HENRY R. JILES, *Primary Examiner.*

HARRY T. MOATZ, *Assistant Examiner.*

U.S. Cl. X.R.

167—65; 260—482

UNITED STATES PATENT OFFICE
CERTIFICATE OF CORRECTION

Patent No. 3,436,392            April 1, 19

Alfred R. Maass et al.

It is certified that error appears in the above identified patent and that said Letters Patent are hereby corrected as shown below:

Column 8, lines 30 to 39, the formula should appear as shown below:

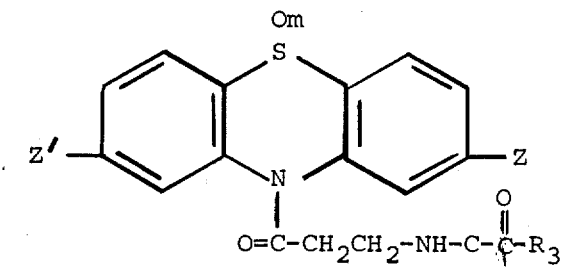

(SEAL)      Signed and sealed this 7th day of April 1970.

Attest:

Edward M. Fletcher, Jr.          WILLIAM E. SCHUYLER,

Attesting Officer                  Commissioner of Patent